United States Patent Office 3,010,836
Patented Nov. 28, 1961

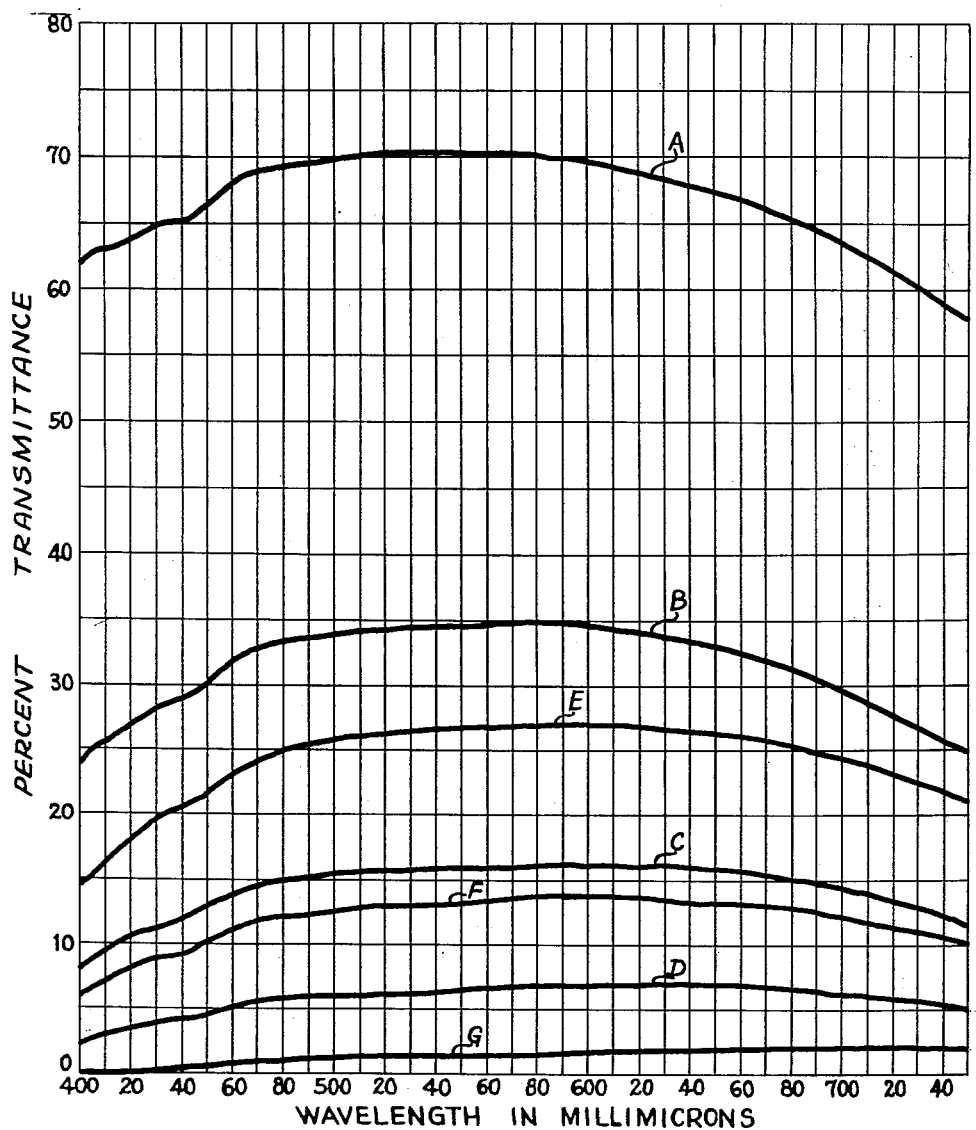
INVENTORS
LEE O. UPTON
ROBERT W. YOUNG
BY
ATTORNEY

3,010,836
NEUTRAL GLASSES AND METHOD OF MAKING THE SAME
Lee O. Upton, Sturbridge, Mass., and Robert W. Young, Woodstock, Conn., assignors to American Optical Company, Southbridge, Mass., a voluntary association of Massachusetts
Filed June 8, 1959, Ser. No. 818,664
15 Claims. (Cl. 106—54)

This invention relates to glass compositions and more particularly to a series of optical glasses which are adapted especially for use as sunglasses, filters, or similar articles and method of making the same.

Most prior art sunglasses either have a peak transmittance in the green portion of the visible spectrum or have a pinkish, bluish, or yellowish tint.

The present invention relates as its primary object to the provision of a series of neutral gray glasses which have substantially uniform transmittances throughout the visible portion of the spectrum, with low ultra-violet and infra-red transmittances and method of making the same.

Another object is to provide a series of neutral gray glasses ranging in visual transmittances between approximately 6% and 70% at thicknesses of approximately 2.0 millimeters and which are particularly suitable for use as sunglasses, filters, or other similar articles and method of making the same.

Another object is to provide glasses of the above nature with low transmittances in the ultra-violet and near infra-red portions of the spectrum, which have good resistance to attack by moisture at elevated temperatures and which are resistant to devitrification.

Another object is to provide a neutral gray glass having a transmittance in the visible portion of the spectrum of approximately 16% at a thickness of approximately 2.0 milimeters and having zero percent ultra-violet transmittance at 370 millimicrons and below, and having low transmittance in the infra-red region of the spectrum.

Another object is to provide glass compositions of the above character containing iron as the only colorant, the iron being introduced into the batch as ferrous oxalate thereby eliminating the need (as is common in the prior art) for the use of carbon, charcoal, silicon, or furnace atmosphere or other reducing agents either internally or externally of the batch in order to control the oxidation state of the iron in the glass whereby the iron in the resultant glass composition is present predominantly as ferrous oxide.

Another object is to provide a borosilicate glass composition of the above character wherein potters flint is employed as the source of silica, and potassium borate is employed as the source of potassium oxide, and boric oxide so as to yield the desired homogeneity and uniformity of neutral color.

Another object is to provide glasses of the above nature resulting from batch compositions A, C and D as given hereinafter whose color is expressed in terms of $x$, $y$, and $z$ Chromaticity Coordinates as defined in paragraph 2–2.2 of American Standard Method For Determination Of Color Specification, Z 58.7.2—1951, published by the American Standards Association of 70 East 45th Street, New York 17, New York, dated April 13, 1951, wherein the $x$ coordinate ranges from 0.312 to 0.339, $y$ coordinate ranges from 0.323 to 0.345 and $z$ coordinate ranges from 0.307 to 0.365.

Another object is to provide glass compositions comprising the following ingredients expressed in weight percent:

| | Proportion |
|---|---|
| Silica, $SiO_2$ | 52–62 |
| Potassium oxide, $K_2O$ | 10–15 |
| Boric oxide, $B_2O_3$ | 15–20 |
| Zinc oxide, $ZnO$ | 1–9 |
| Ferrous oxide, $FeO$ | 1–4 |
| Alumina, $Al_2O_3$ | 0–3 |
| Zirconia, $ZrO_2$ | 0–7 |
| Magnesia, $MgO$ | 0–1 |
| Sodium oxide, $Na_2O$ | 0–8 |
| Lithia, $Li_2O$ | 0–4 | wherein certain of the ingredients may be varied within the above ranges to give desired working properties to the glass.

Still another object is to provide a glass whose chemical analysis is as follows:

| | Weight percent |
|---|---|
| Silica, $SiO_2$ | 53.52 |
| Potassium oxide, $K_2O$ | 10.80 |
| Zinc oxide, $ZnO$ | 7.74 |
| Zirconia, $ZrO_2$ | 5.20 |
| Boric oxide, $B_2O_3$ | 19.00 |
| Total iron as $FeO$ | 2.66 |
| Alumina, $Al_2O_3$ | 0.89 |
| | 99.81 |

Another object is to form glasses of the above character which are free from bubbles, striae, and foreign matter and which are uniform in color.

Other objects and advantages of the invention will become apparent when taken in connection with the following description and the accompanying drawings wherein:

The figure of the drawing is a chart representing the transmittances in the visual and near infra-red portions of the spectrum for glasses resulting from batches A through G for thicknesses of approximately 2.0 millimeters as referred to hereinafter.

In the drawing, line A indicates the transmission characteristics of a light shade glass resulting from composition A comprising the following ingredients expressed in weight percent:

| | Proportion, percent |
|---|---|
| Silica, $SiO_2$ | 56.8 |
| Potassium oxide, $K_2O$ | 11.7 |
| Boric oxide, $B_2O_3$ | 17.4 |
| Zinc oxide, $ZnO$ | 8.1 |
| Zirconia, $ZrO_2$ | 5.0 |
| Ferrous oxide, $FeO$ | 1.0 |
| | 100.0 |

The optical properties of the above glass are as follows:

| | |
|---|---|
| Percent vis. trans | 69.5 |
| Percent total energy trans | 51.5 |
| Percent trans. in UV @ 342 m$\mu$ | 5.0 |
| Percent efficiency as heat absorber | 25.9 | as determined by the formula $$\left[1 - \frac{\text{Percent total energy trans.}}{\text{Percent visual transmission}}\right] \times 100$$

In the drawing, line B indicates the transmission characteristics of an intermediate shade glass resulting from composition B comprising the following ingredients expressed in weight percent:

| | Proportion, percent |
|---|---|
| Silica, $SiO_2$ | 56.2 |
| Potassium oxide, $K_2O$ | 11.6 |
| Boric oxide, $B_2O_3$ | 17.2 |
| Zinc oxide, ZnO | 8.0 |
| Zirconia, $ZrO_2$ | 5.0 |
| Ferrous oxide, FeO | 2.0 |
| | 100.0 |

The optical properties of the above glass are as follows:

| | |
|---|---|
| Percent vis. trans | 35.0 |
| Percent total energy trans | 21.5 |
| Percent trans. in UV @ 361 mμ | 5.0 |
| Percent efficiency as heat absorber | 38.6 | as determined by the above formula.

In the drawing, line C indicates the transmission characteristics of an intermediate shade glass resulting from composition C comprising the following ingredients expressed in weight percent:

| | Proportion, percent |
|---|---|
| Silica, $SiO_2$ | 55.9 |
| Potassium oxide, $K_2O$ | 11.5 |
| Boric oxide, $B_2O_3$ | 17.0 |
| Zinc oxide, ZnO | 7.9 |
| Zirconia, $ZrO_2$ | 4.9 |
| Ferrous oxide, FeO | 2.8 |
| | 100.0 |

The optical properties of the above glass are as follows:

| | |
|---|---|
| Percent vis. trans | 15.2 |
| Percent total energy trans | 11.0 |
| Percent trans. in UV @ 390 mμ | 5.0 |
| Percent efficiency as heat absorber | 27.6 | as determined by the above formula.

In the drawing, line D indicates the transmission characteristics of a dark shade glass resulting from composition D comprising the following ingredients expressed in weight percent:

| | Proportion, percent |
|---|---|
| Silica, $SiO_2$ | 55.5 |
| Potassium oxide, $K_2O$ | 11.4 |
| Boric oxide, $B_2O_3$ | 17.0 |
| Zinc oxide, ZnO | 7.8 |
| Zirconia, $ZrO_2$ | 4.9 |
| Ferrous oxide, FeO | 3.4 |
| | 100.0 |

The optical properties of the above glass are as follows:

| | |
|---|---|
| Percent vis. trans | 6.7 |
| Percent total energy trans | 6.2 |
| Percent transmission @ 458 mμ | 5.0 |
| Percent efficiency as heat absorber | 7.5 | as determined by the above formula.

Lines E and F indicate the transmission curve of two additional intermediate shades resulting from compositions comprising the following ingredients expressed in weight percent:

| | Batch E, percent | Batch F, percent |
|---|---|---|
| Silica, $SiO_2$ | 59.1 | 58.8 |
| Potassium Oxide, $K_2O$ | 12.2 | 12.1 |
| Boric Oxide, $B_2O_3$ | 18.1 | 17.9 |
| Zinc Oxide, ZnO | 8.4 | 8.3 |
| Ferrous Oxide, FeO | 2.2 | 2.9 |
| | 100.0 | 100.0 |

Line G represents a transmission curve of a dark shade glass composition comprising the following ingredients expressed in weight percent:

| | Batch G, percent |
|---|---|
| Silica, $SiO_2$ | 58.3 |
| Potassium oxide, $K_2O$ | 12.0 |
| Boric oxide, $B_2O_3$ | 17.9 |
| Zinc oxide, ZnO | 8.2 |
| Ferrous oxide, FeO | 3.6 |
| | 100.0 |

Other batches yielding various shades and resulting from glass compositions comprising the following ingredients expressed in weight percent are as follows:

| | Intermediate Shades | | | Dark Shades | | |
|---|---|---|---|---|---|---|
| | Batch H, percent | Batch I, percent | Batch J, percent | Batch K, percent | Batch L, percent | Batch M, percent |
| Silica, $SiO_2$ | 55.6 | 58.7 | 61.0 | 54.0 | 54.9 | 56.8 |
| Potassium Oxide, $K_2O$ | 12.5 | 12.2 | 13.6 | 11.2 | 11.4 | 11.8 |
| Boric Oxide, $B_2O_3$ | 18.6 | 18.0 | 20.1 | 16.6 | 16.8 | 17.4 |
| Zinc Oxide, ZnO | 2.8 | 8.4 | 3.0 | 7.7 | 7.8 | 8.1 |
| Ferrous Oxide, FeO | 2.3 | 2.7 | 2.3 | 3.0 | 2.7 | 2.8 |
| Alumina, $Al_2O_3$ | 1.6 | | | 1.5 | | |
| Zirconia, $ZrO_2$ | 5.8 | | | 5.3 | | |
| Magnesia, MgO | 0.8 | | | 0.7 | | |
| Sodium Oxide, $Na_2O$ | | | | | 6.4 | |
| Lithia, $Li_2O$ | | | | | | 3.1 |
| | 100.0 | 100.0 | 100.0 | 100.0 | 100.0 | 100.0 |

While several batch compositions have been set forth above within the scope of the invention, there are certain glass compositions which are particularly desirable for use as sun glasses and filters. These glass compositions fall within the following ranges of ingredients expressed in weight percent:

| | Proportion |
|---|---|
| Silica, $SiO_2$ | 52–62 |
| Potassium oxide, $K_2O$ | 10–15 |
| Boric oxide, $B_2O_3$ | 15–20 |
| Zinc oxide, ZnO | 1–9 |
| Ferrous oxide, FeO | 1–4 |
| Alumina, $Al_2O_3$ | 0–3 |
| Zirconia, $ZrO_2$ | 0–7 |
| Magnesia, MgO | 0–1 |
| Sodium oxide, $Na_2O$ | 0–8 |
| Lithia, $Li_2O$ | 0–4 |

One glass composition which is of particular interest, namely composition C, has a chemical analysis as follows:

| | Weight percent |
|---|---|
| Silica, $SiO_2$ | 53.52 |
| Potassium oxide, $K_2O$ | 10.80 |
| Zinc oxide, ZnO | 7.74 |
| Zirconia, $ZrO_2$ | 5.20 |
| Boric oxide, $B_2O_3$ | 19.00 |
| Total iron as FeO | 2.66 |
| Alumina, $Al_2O_3$ | 0.89 |

The chromaticity of glasses resulting from batches A, C and D are determined in accordance with the American Standard Color Specification consisting of the chromaticity coordinates $x$, $y$, and $z$ are as follows:

| Batch A | Batch C | Batch D |
|---|---|---|
| $x=0.312$ | $x=0.326$ | $x=0.339$ |
| $y=0.323$ | $y=0.342$ | $y=0.354$ |
| $z=0.365$ | $z=0.332$ | $z=0.307$ | and thereby fall within the $x$, $y$, $z$ ranges of $x=0.312$ to $0.339$
$y=0.323$ to $0.354$
$z=0.307$ to $0.365$ While the $x$, $y$, $z$ values are given specifically for batches A, C and D, it is to be understood that chromaticity of glass resuling from all of the above batches would have similar $x$, $y$, $z$ values. As previously stated, chromaticity coordinates, $x$, $y$, and $z$ are as defined in paragraph 2–2.2 of the American Standard Method for Determination of Color Specification, Z 58.7.2—1951, published by the American Standards Association of 70 East 45th Street, New York 17, New York, dated April 13, 1951.

It is pointed out that the glass compositions of the above character contain iron as the only colorant, the iron being introduced into the batch as ferrous oxalate thereby eliminating the need (as is common in the prior art) for the use of carbon, charcoal, silicon, or the furnace atmosphere or other reducing agents either internally or externally of the batch in order to control the oxidation state of the iron in the glass whereby the iron in the resultant glass composition is present predominantly as ferrous oxide.

The use of ferrous oxalate is essential in the forming of the compositions of the invention so as to obtain the desired uniform transmittance in the visible portion of the spectrum.

It is further pointed out that the borosilicate glass compositions of the above character result from the use of potters flint which is employed as the source of silica, and potassium borate employed as the source of potassium oxide and boric oxide. This is essential to yield the desired homogeneity and also the desired uniform neutral color.

It has been found that sand, in a large grain size, does not function in the same manner as the potters flint referred to above and that it is essential to the present invention to use potters flint in order to yield glasses of the above nature having uniform neutral color. It has also been found that the potassium oxide is an essential ingredient in the glass compositions as well as boric oxide and that these oxides must be introduced into the batch in approximately the stoichiometric ratio of potassium to boron in the compound potassium borate, the reason being that this also is important to maintain the uniform neutral color and control of the state of oxidation of the iron.

Not only must potassium oxide and boric oxide be in the proper stoichiometric ratio but they should be prechemically combined in order to maintain the desired neutral color and homogeneity in the glass compositions.

The above-mentioned glasses may be made by means of conventional electric resistance or gas-fired furnaces within the conventional melting range of from 2600 to 2700° F.

As shown in the chart of the drawing, the resultant glasses all have a substantially uniform transmittance curve in the visible portion of the spectrum.

While the above shades are given for glasses having a thickness of approximately 2.0 millimeters, it is pointed out that curve A indicates glass resulting from batch A having a thickness of 1.968 millimeters; curve B indicates glass resulting from batch B having a thickness of 1.982 millimeters; curve C indicates glass resulting from batch C having a thickness of 2.01 millimeters; curve D indicates glass resulting from batch D having a thickness of 1.992 millimeters; curve E indicates glass resulting from batch E having a thickness of 1.978 millimeters; curve F indicates glass resulting from batch F having a thickness of 1.975 millimeters; and curve G indicates glass resulting from batch G having a thickness of 1.960 millimeters.

While certain ingredients, such as $Al_2O_3$ in percent by weight from 0 to 3; $ZrO_2$ from 0 to 7; $MgO$ from 0 to 1; $Na_2O$ from 0 to 1; and $Li_2O$ from 0 to 4, have been referred to above for use in said batches, it is to be understood that these ingredients may be varied within the above ranges to give the desired working properties to the glass and, as shown by the percentages given, may or may not be required in certain of said batches.

It is further pointed out that glasses of the above character are free from bubbles, striae, and foreign matter and are uniform in color. Their efficiency as a heat absorber may be derived from the formula $$\left[1 - \frac{\text{Percent total energy trans.}}{\text{Percent visual transmission}}\right] \times 100$$

as referred to above in connection with certain of the batches and the color is obtainable from the chromaticity coordinates $x$, $y$ and $z$ in the manner defined above.

While the index of refraction of the glasses is not of particular importance, the said index is approximately 1.51 to 1.53.

While certain of the glasses resulting from the compositions set forth above have been stated as being of particular value for use as sun glasses, it is pointed out that other of said glasses are of particular interest for use as filters or the like and are adaptable to a relatively wide range of uses, such, for example, as in photography or the like and the invention, therefore, is not to be interpreted in a limiting sense.

From the foregoing description, it will be seen that many uniform neutral shade glasses may be formed in accordance with the invention and that the curves set forth in the chart of the drawing are illustrative of the uniformity of transmittance of the various glasses and are given herein only by way of illustration.

Having described our invention, we claim:

1. A glass composition consisting by weight of:

| | Percent |
|---|---|
| Silica, $SiO_2$ | 52–62 |
| Potassium oxide, $K_2O$ | 10–15 |
| Boric oxide, $B_2O_3$ | 15–20 |
| Zinc oxide, $ZnO$ | 1–9 |
| Ferrous oxide, $FeO$ introduced as Ferrous oxalate | 1–4 |
| Alumina, $Al_2O_3$ | 0–3 |
| Zirconia, $ZrO_2$ | 0–7 |
| Magnesia, $MgO$ | 0–1 |
| Sodium oxide, $Na_2O$ | 0–8 |
| Lithia, $Li_2O$ | 0–4 |

2. A glass composition consisting by weight of:

| | Percent |
|---|---|
| Silica, $SiO_2$ | 56.8 |
| Potassium oxide, $K_2O$ | 11.7 |
| Boric oxide, $B_2O_3$ | 17.4 |
| Zinc oxide, $ZnO$ | 8.1 |
| Zirconia, $ZrO_2$ | 5.0 |
| Ferrous oxide, $FeO$ introduced as Ferrous oxalate | 1.0 | and whose optical properties are:

| | |
|---|---|
| Percent vis. trans. | 69.5 |
| Percent total energy trans. | 51.5 |
| Percent trans. in UV @ m$\mu$ | 5.0 |
| Percent efficiency as heat absorber | 25.9 | as determined by the formula $$\left[1 - \frac{\text{Percent total energy trans.}}{\text{Percent visual transmission}}\right] \times 100$$

3. A glass composition consisting by weight of:

| | Percent |
|---|---|
| Silica, $SiO_2$ | 56.2 |
| Potassium oxide, $K_2O$ | 11.6 |
| Boric oxide, $B_2O_3$ | 17.2 |
| Zinc oxide, ZnO | 8.0 |
| Zirconia, $ZrO_2$ | 5.0 |
| Ferrous oxide, FeO introduced as Ferrous oxalate | 2.0 | and whose optical properties are:

| | |
|---|---|
| Percent vis. trans. | 35.0 |
| Percent total energy trans. | 21.5 |
| Percent trans. in UV @ mμ | 5.0 |
| Percent efficiency as heat absorber | 38.6 | as determined by the above formula in claim 2.

4. A glass composition consisting by weight of:

| | Percent |
|---|---|
| Silica, $SiO_2$ | 55.9 |
| Potassium oxide, $K_2O$ | 11.5 |
| Boric oxide, $B_2O_3$ | 17.0 |
| Zinc oxide, ZnO | 7.9 |
| Zirconia, $ZrO_2$ | 4.9 |
| Ferrous oxide, FeO introduced as Ferrous oxalate | 2.8 | and whose optical properties are:

| | |
|---|---|
| Percent vis. trans. | 15.2 |
| Percent total energy trans. | 11.0 |
| Percent trans. in UV @ 390 mμ | 5.0 |
| Percent efficiency as heat absorber | 27.6 | as determinted by the above formula in claim 2.

5. A glass composition consisting by weight of:

| | Percent |
|---|---|
| Silica, $SiO_2$ | 55.5 |
| Potassium oxide, $K_2O$ | 11.4 |
| Boric Oxide, $B_2O_3$ | 17.0 |
| Zinc oxide, ZnO | 7.8 |
| Zirconia, $ZrO_2$ | 4.9 |
| Ferrous oxide, FeO introduced as Ferrous oxalate | 3.4 | and whose optical properties are:

| | |
|---|---|
| Percent vis. trans. | 6.7 |
| Percent total energy trans. | 6.2 |
| Percent transmission @ 458 mμ | 5.0 |
| Percent efficiency as heat absorber | 7.5 | as determined by the above formula in claim 2.

6. A glass composition consisting by weight of:

| | Percent |
|---|---|
| Silica, $SiO_2$ | 59.1 |
| Potassium oxide, $K_2O$ | 12.2 |
| Boric oxide, $B_2O_3$ | 18.1 |
| Zince oxide, ZnO | 8.4 |
| Ferrous oxide, FeO introduced as Ferrous oxalate | 2.2 |

7. A glass composition consisting by weight of:

| | Percent |
|---|---|
| Silica, $SiO_2$ | 58.8 |
| Potassium oxide, $K_2O$ | 12.1 |
| Boric oxide, $B_2O_3$ | 17.9 |
| Zinc oxide, ZnO | 8.3 |
| Ferrous oxide, FeO introduced as Ferrous oxalate | 2.9 |

8. A glass composition consisting by weight of:

| | Percent |
|---|---|
| Silica, $SiO_2$ | 58.3 |
| Potassium oxide, $K_2O$ | 12.0 |
| Boric oxide, $B_2O_3$ | 17.9 |
| Zinc oxide, ZnO | 8.2 |
| Ferrous oxide, FeO introduced as Ferrous oxalate | 3.6 |

9. A glass composition consisting by weight of:

| | Percent |
|---|---|
| Silica, $SiO_2$ | 55.6 |
| Potassium oxide, $K_2O$ | 12.5 |
| Boric oxide, $B_2O_3$ | 18.6 |
| Zinc oxide, ZnO | 2.8 |
| Ferrous oxide, FeO introduced as Ferrous oxalate | 2.3 |
| Alumina, $Al_2O_3$ | 1.6 |
| Zirconia, $ZrO_2$ | 5.8 |
| Magnesia, MgO | 0.8 |

10. A glass composition consisting by weight of:

| | Percent |
|---|---|
| Silica, $SiO_2$ | 58.7 |
| Potassium oxide, $K_2O$ | 12.2 |
| Boric oxide, $B_2O_3$ | 18.0 |
| Zinc oxide, ZnO | 8.4 |
| Ferrous oxide, FeO introduced as Ferrous oxalate | 2.7 |

11. A glass composition consisting by weight of:

| | Percent |
|---|---|
| Silica, $SiO_2$ | 61.0 |
| Potassium oxide, $K_2O$ | 13.6 |
| Boric oxide, $B_2O_3$ | 20.1 |
| Zinc oxide, ZnO | 3.0 |
| Ferrous oxide, FeO introduced as ferrous oxalate | 2.3 |

12. A glass composition consisting by weight of:

| | Percent |
|---|---|
| Silica, $SiO_2$ | 54.0 |
| Potassium oxide, $K_2O$ | 11.2 |
| Boric oxide, $B_2O_3$ | 16.6 |
| Zinc oxide, ZnO | 7.7 |
| Ferrous oxide, FeO introduced as ferrous oxalate | 3.0 |
| Alumina, $Al_2O_3$ | 1.5 |
| Zirconia, $ZrO_2$ | 5.3 |
| Magnesia, MgO | 0.7 |

13. A glass composition consisting by weight of:

| | Percent |
|---|---|
| Silica, $SiO_2$ | 54.9 |
| Potassium oxide, $K_2O$ | 11.4 |
| Boric oxide, $B_2O_3$ | 16.8 |
| Zinc oxide, ZnO | 7.8 |
| Ferrous oxide, FeO introduced as ferrous oxalate | 2.7 |
| Sodium oxide, $Na_2O$ | 6.4 |

14. A glass composition consisting by weight of:

| | Percent |
|---|---|
| Silica, $SiO_2$ | 56.8 |
| Potassium oxide, $K_2O$ | 11.8 |
| Boric oxide, $B_2O_3$ | 17.4 |
| Zinc oxide, ZnO | 8.1 |
| Ferrous oxide, FeO introduced as ferrous oxalate | 2.8 |
| Lithia, $Li_2O$ | 3.1 |

15. A glass whose chemical analysis is as follows:

| | Percent |
|---|---|
| Silica, $SiO_2$ | 53.52 |
| Potassium oxide, $K_2O$ | 10.80 |
| Zinc oxide, ZnO | 7.74 |
| Zirconia, $ZrO_2$ | 5.20 |
| Boric oxide, $B_2O_3$ | 19.00 |
| Total iron as FeO introduced as ferrous oxalate | 2.66 |
| Alumina, $Al_2O_3$ | 0.89 |

References Cited in the file of this patent

UNITED STATES PATENTS

| 2,582,852 | Shoemaker | Jan. 15, 1952 |
| 2,688,561 | Armistead | Sept. 7, 1954 |
| 2,748,006 | Kreidl et al. | May 29, 1956 |

OTHER REFERENCES

Glastechnische Tabellen (Ger.), p. 700, by Eitel et al. (1932).